(12) United States Patent
Fischgrund et al.

(10) Patent No.: US 11,188,964 B2
(45) Date of Patent: Nov. 30, 2021

(54) SELF-SERVICE MERCHANDISE REQUEST SYSTEM

(71) Applicant: Dick's Sporting Goods, Inc., Coraopolis, PA (US)

(72) Inventors: Justin Tyler Fischgrund, Coraopolis, PA (US); Orin Guo, Coraopolis, PA (US); Zachary Pontious, Coraopolis, PA (US); Joel Roman Sosa-Rivera, Coraopolis, PA (US)

(73) Assignee: DICK'S SPORTING GOODS, INC., Coraopolis, PA (US)

( * ) Notice: Subject to any disclaimer, the term of this patent is extended or adjusted under 35 U.S.C. 154(b) by 134 days.

(21) Appl. No.: 16/601,636

(22) Filed: Oct. 15, 2019

(65) Prior Publication Data

US 2021/0012403 A1 Jan. 14, 2021

Related U.S. Application Data

(60) Provisional application No. 62/872,752, filed on Jul. 11, 2019.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0625* (2013.01); *G06N 20/00* (2019.01)

(58) Field of Classification Search
None
See application file for complete search history.

(56) References Cited

U.S. PATENT DOCUMENTS

| 6,616,047 | B2 | 9/2003 | Catan |
| 6,693,539 | B2 | 2/2004 | Bowers et al. |
| 9,256,893 | B2 | 2/2016 | Vernick |
| 9,672,549 | B2 | 6/2017 | Vernick |
| 9,965,746 | B1 | 5/2018 | Keiser et al. |
| 9,990,637 | B2 | 6/2018 | Chauhan et al. |
| 10,078,824 | B2 | 9/2018 | Edwards et al. |
| 10,078,825 | B2 | 9/2018 | Cummings |
| 10,204,346 | B2 | 2/2019 | Chauhan et al. |

(Continued)

*Primary Examiner* — Mila Airapetian
(74) *Attorney, Agent, or Firm* — Fox Rothschild LLP

(57) ABSTRACT

Systems and methods are provided for requesting a product at a retail establishment. The system includes an electronic device and a computer-readable storage medium which includes one or more programming instructions that cause the electronic device to receive, from an on-premises electronic device located at a retail establishment, data pertaining to a product including a unique identifier associated with the product, determine whether the product is an item of footwear, and identify current inventory information associated with the product in response to determining that the product is an item of footwear. The one or more programming instructions further cause the electronic device to send at least a portion of the current inventory information to the on-premises electronic device, receive a request for the product, and send a notification of the request to one or more associate electronic devices, each being associated with an associate in the retail establishment.

20 Claims, 12 Drawing Sheets

(56) References Cited

U.S. PATENT DOCUMENTS

| | | | |
|---|---|---|---|
| 2006/0237532 A1* | 10/2006 | Scott-Leikach | G07F 7/02 |
| | | | 235/383 |
| 2010/0036670 A1 | 2/2010 | Hill et al. | |
| 2016/0042315 A1 | 2/2016 | Field-Darragh et al. | |

* cited by examiner

FIG. 5

SELF-SERVICE MERCHANDISE REQUEST SYSTEM

CROSS REFERENCE TO RELATED APPLICATIONS

This application claims priority to U.S. Provisional Patent Application No. 62/872,752, filed Jul. 11, 2019, entitled "Self-Service Merchandise Request System", the disclosure of which is hereby incorporated by reference in its entirety.

BACKGROUND

In the age of online shopping, there are still many items that are often purchased in brick and mortar stores. These are typically items that a shopper would like to try on or inspect before buying such as, for example, shoes. However, purchasing merchandise in a brick and mortar store can pose several challenges to customers.

Customers may encounter a plethora of options of merchandise ranging from size, color, width, style, etc., and must decide which items the customer wants to try on. This is only if the customer was able to locate an item on their own on the shelves.

If a customer is unable to locate a particular item, a particular size, or is uncertain which type of item to purchase, the customer is then required to locate and/or wait for a store associate for assistance in determining which item to purchase, determine where in the store the item is, and determine if the item is even in stock. This can result in a lengthy and inefficient shopping experience, leading to unhappy, frustrated, and/or unsatisfied customers.

For at least these reasons, an automated system is needed which is configured to aid customers in understanding inventory availability and in requesting merchandise for purchase without having to wait for a store associate's assistance.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system for requesting a product at a retail establishment is provided. The system includes an electronic device and a computer-readable storage medium which includes one or more programming instructions that, when executed, cause the electronic device to receive, from an on-premises electronic device located at a retail establishment, data pertaining to a product including a unique identifier associated with the product, determine whether the product is an item of footwear, and identify current inventory information associated with the product in response to determining that the product is an item of footwear. The one or more programming instructions further cause the electronic device to send at least a portion of the current inventory information to the on-premises electronic device, receive, from the on-premises electronic device, a request for the product including one or more product selections, and send a notification of the request to one or more associate electronic devices, each associate electronic device being associated with an associate in the retail establishment.

The unique identifier associated with the product may be obtained by a scanning device associated with the on-premises electronic device. The scanning device may include one or more of a barcode scanner, a radio-frequency identification scanner, and/or an image capturing device.

In an embodiment, the system may retrieve a product record associated with the product from a data store based on the unique identifier, identify from the product record one or more attributes of the product, identify one or more product descriptors associated with footwear, and, for one or more of the attributes, determine if the attribute is consistent with its corresponding product descriptor. The one or more attributes may include a size, a width, a color, a material, a brand, a gender, and/or a product type.

The system may retrieve a product record associated with the product from a data store based on the unique identifier, identify from the product record one or more attributes of the product, and apply a machine learning model to the one or more attributes.

The system may retrieve a product image associated with the product from a data store based on the unique identifier and apply a machine learning model to the product image.

The system may retrieve a product record associated with the product from a data store based on the unique identifier, identify a product image associated with the product from the product record, perform one or more image processing techniques on the product image to identify one or more attributes of the product, identify one or more product descriptors associated with footwear, and for one or more of the attributes, determine if the attribute is consistent with its corresponding product descriptor.

The system may cause an error message to be displayed at the on-premises electronic device in response to determining that the product is not an article of footwear.

The system may add the request to a queue of received requests, and cause a visual representation of the queue to be displayed via one or more display devices in the retail establishment.

In an embodiment, a method for requesting a product at a retail establishment is provided. The method includes receiving, from an on-premises electronic device located at a retail establishment, data pertaining to a product that includes a unique identifier associated with the product, determining whether the product is an item of footwear, and, in response to determining that the product is an item of footwear, identifying current inventory information associated with the product. The method further includes sending at least a portion of the current inventory information to the on-premises electronic device, receiving, from the on-premises electronic device, a request for the product including one or more product selections, and sending a notification of the request to one or more associate electronic devices, each associate electronic device being associated with an associate in the retail establishment.

Receiving data pertaining to the product may include scanning a target item coupled to the product using a scanning device associated with the on-premises electronic device. The scanning device may include a barcode scanner, a radio-frequency identification scanner, and/or an image capturing device.

Determining whether the product is an item of footwear may include retrieving a product record associated with the product from a data store based on the unique identifier, identifying from the product record one or more attributes of the product, identifying one or more product descriptors associated with footwear, and, for one or more of the attributes, determining if the attribute is consistent with its corresponding product descriptor. The one or more attributes may include a size, a width, a color, a material, a brand, a gender, and/or a product type.

Determining whether the product is an item of footwear may include retrieving a product record associated with the product from a data store based on the unique identifier, identifying from the product record one or more attributes of the product, and applying a machine learning model to the one or more attributes.

Determining whether the product is an item of footwear may include retrieving a product image associated with the product from a data store based on the unique identifier, and applying a machine learning model to the product image.

Determining whether the product is an item of footwear may include retrieving a product record associated with the product from a data store based on the unique identifier, identifying a product image associated with the product from the product record, performing one or more image processing techniques on the product image to identify one or more attributes of the product, identifying one or more product descriptors associated with footwear, and, for one or more of the attributes, determining if the attribute is consistent with its corresponding product descriptor.

The method further include, in response to determining that the product is not an article of footwear, causing an error message to be displayed at the on-premises electronic device.

In an embodiment, the method may further include adding the request to a queue of received requests, and causing a visual representation of the queue to be displayed via one or more display devices in the retail establishment.

BRIEF DESCRIPTION OF THE DRAWINGS

FIG. 5 shows a screenshot of an example graphical user interface displaying available inventory of a particular product.

DETAILED DESCRIPTION

Figure 1:
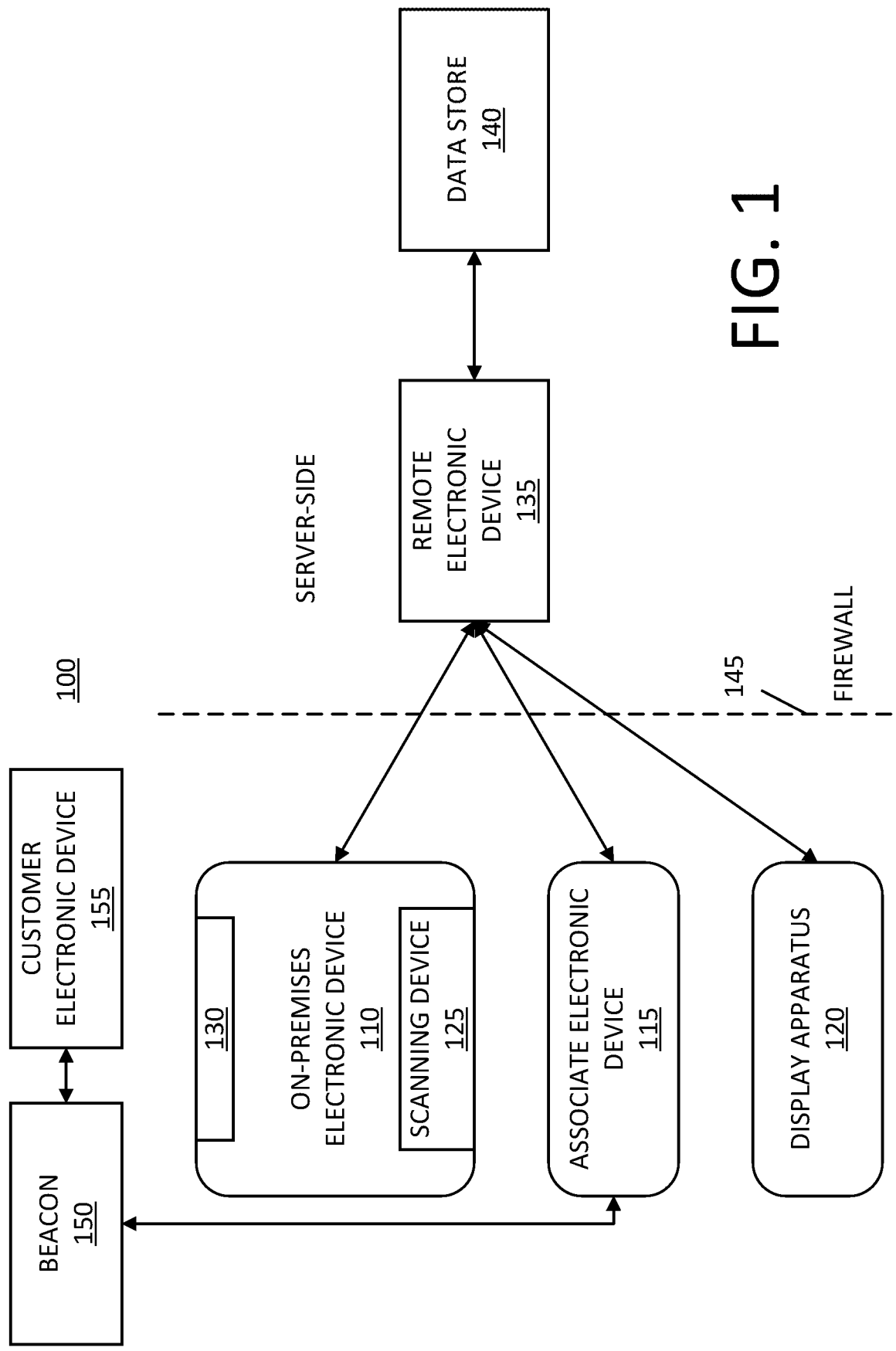
FIG. 1 shows a block diagram of an example self-service merchandise request system.

In this document: (i) the term "comprising" means "including, but not limited to"; the singular forms "a," "an," and "the" include plural references unless the context clearly dictates otherwise; and (iii) unless defined otherwise, all technical and scientific terms used in this document have the same meanings as commonly understood by one of ordinary skill in the art. Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, kiosks, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "product attribute" refers to a quality, feature or characteristic of a product.

A "product descriptor" refers to one or more product attributes typically associated with a product or a product type.

Referring now to FIG. 1, an example of a self-service merchandise system 100 is illustratively depicted, in accordance with an embodiment.

According to an embodiment, a self-service merchandise system 100 may include one or more on-premises electronic devices 110, one or more associate electronic devices 115, one or more remote electronic devices 135, and/or one or more display apparatuses 120. According to an embodiment, one or more of the on-premises electronic devices 110 may be located in or in proximity to a retail establishment such as, for example, a store, a mall, a shop and/or the like. Alternatively, one or more on-premises electronic devices 110 may be located in or near a location where a system user may be requesting goods and/or services.

An on-premises electronic device 110 may include or be in communication with one or more scanning devices 125. A scanning device 125 refers to a device with one or more sensors configured to obtain information from one or more product tags and/or target items associated with one or more products. Examples of scanning devices 125 include, without limitation, a barcode scanner, a radio-frequency identification (RFID) scanner, an image capturing device (e.g., a camera, etc.) and/or any other suitable form of device for obtaining information from a product tag.

In various embodiments, a scanning device may include an optical scanner which may read information associated with a product. In another embodiment, a scanning device may include a transmitter, receiver and/or transceiver that may send information to and/or receive information from a tag or other device. For instance, a tag may be attached to a product or product tag, and a scanning device may read information stored in the tag. In other embodiments, a scanning device may include a digital camera.

Figure 11:
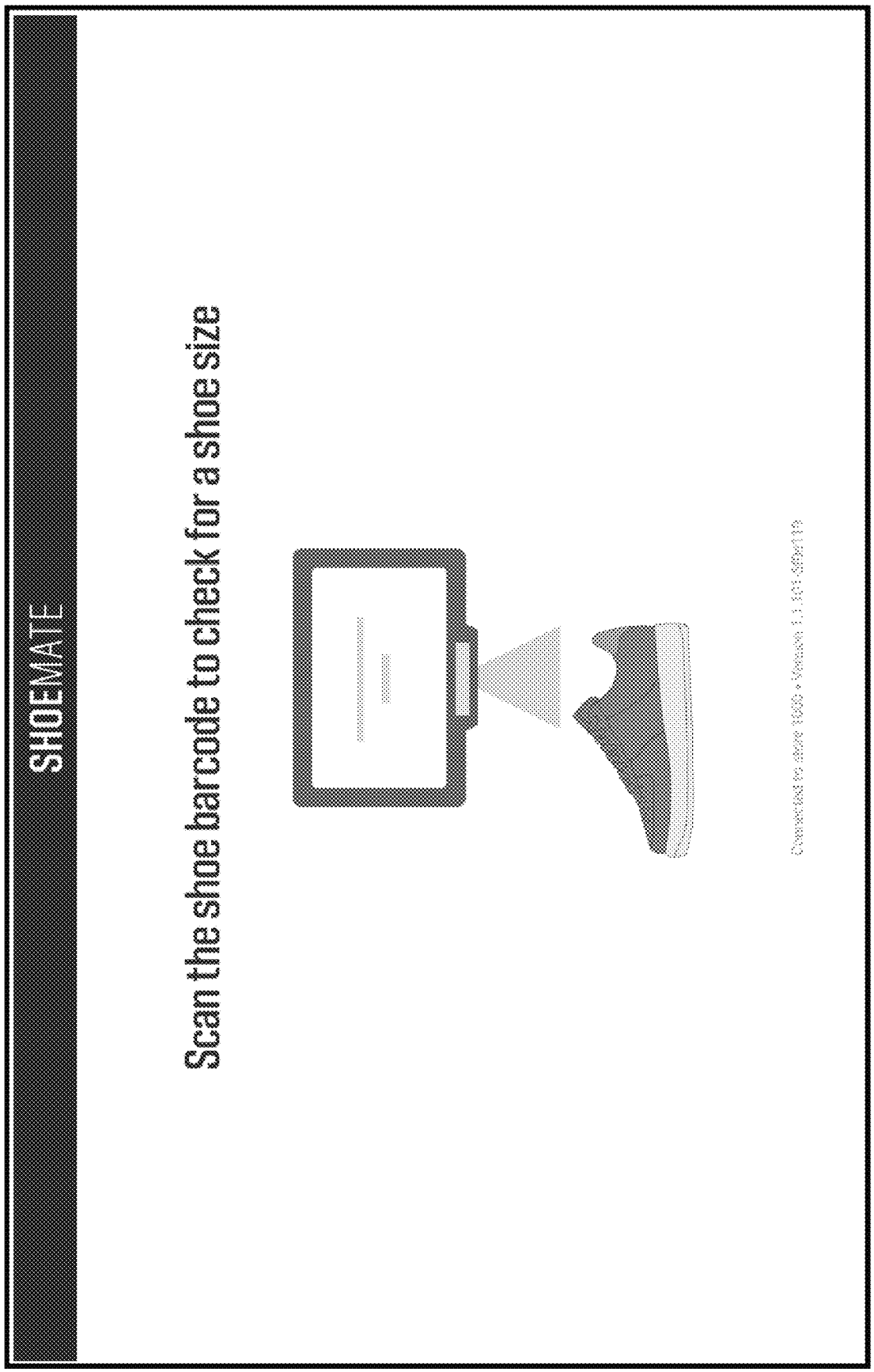
FIG. 11 shows a screenshot of an example graphical user interface displaying instructions for scanning a product.

A product tag refers to a label or other component that is attached to a product or otherwise associated with a product and that includes information pertaining to the product. Examples of product tags include, without limitation, Quick Response (QR) codes, bar codes, RFID tags and/or the like. According to various embodiments, the system may display, to a user, instructions for scanning a product (such as that shown in FIG. 11).

In various embodiments, an on-premises electronic device 110 may include one or more graphical user interfaces 130 configured to enable a user to input information such as, for example, information pertaining to a product, a product attribute, or a product request. In various embodiments, a user may be a customer of the retail establishment in which an on-premises electronic device is located.

Figure 5:
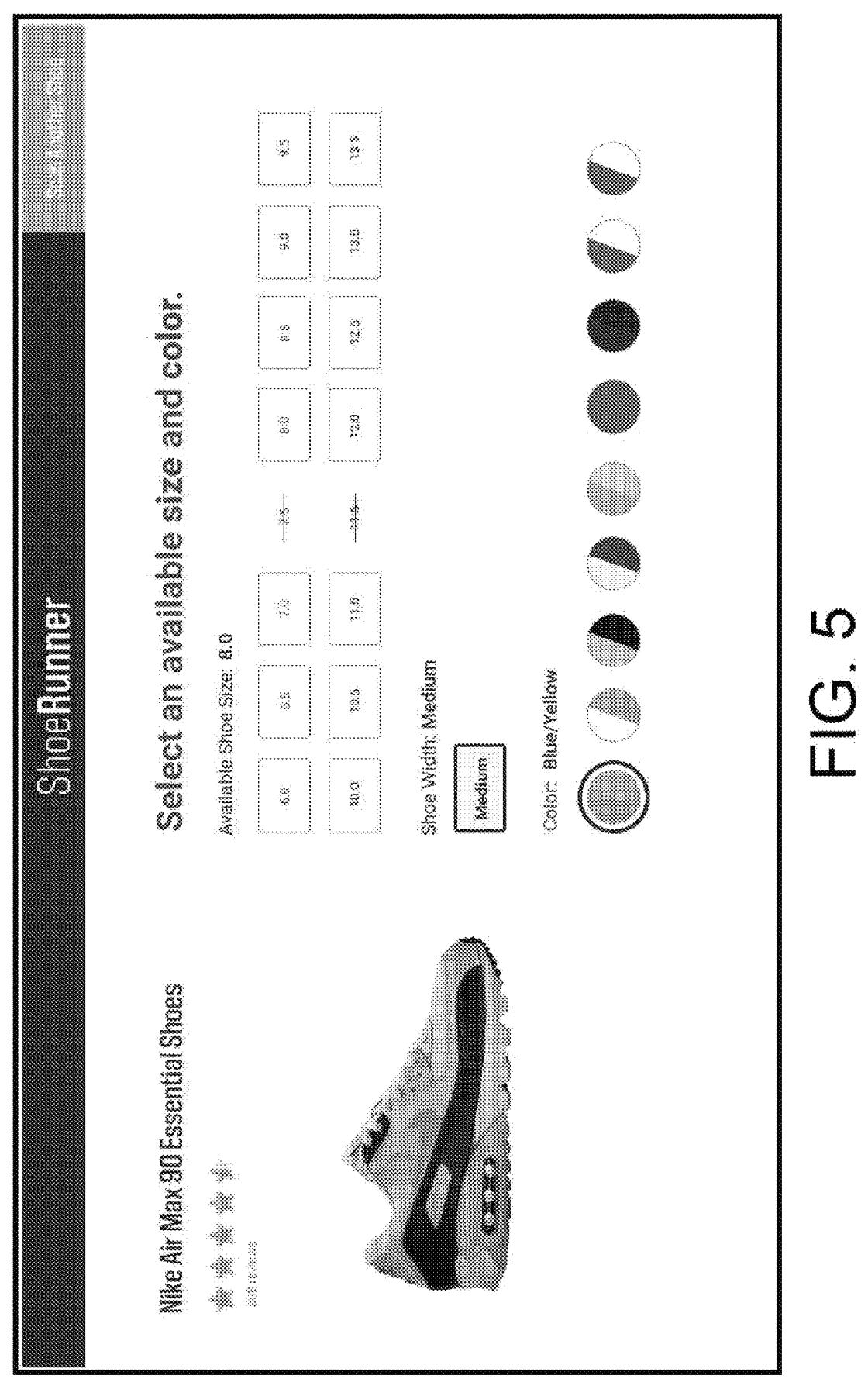

According to an embodiment, one or more of the on-premises electronic devices 110 may be implemented as a self-service kiosk that is programmed to enable one or more customers to scan a product tag in order to determine in-store availability (through an analyzation of the inventory) of the product (including variations of the product such as, e.g., size, width, color, etc.). An example of a user interface that may be displayed to a user, showing an article of footwear and available sizes, widths, and colors of the article of footwear is illustrated in FIG. 5. Footwear refers to an article that is worn on a foot or feet such as, for example, shoes, boots, sandals, slippers and/or the like. In another example, the graphical user interface may show an article of clothing (e.g., shirt, pants, coat, gloves etc.) and/or headwear (hat, scarf, etc.) to the user, showing available brands, colors, sizes, and/or the like. Additional and/or alternate types of merchandise may be used within the scope of this disclosure.

In an embodiment, one or more of the on-premises electronic devices 110 may be configured display a recommended product(s) to a customer. According to an embodiment, the one or more recommendations may be displayed to a customer via a display device such as, for example, a display device of an on-premises electronic device 110. In another embodiment, one or more recommendations may be displayed via display 120.

Figure 6:
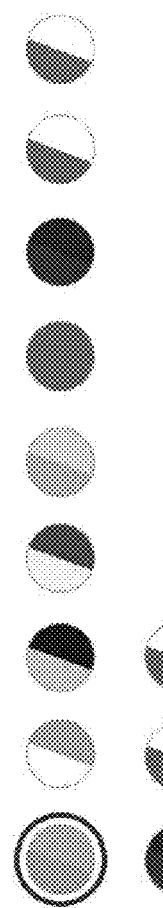
FIG. 6 shows a screenshot of an example graphical user interface displaying available inventory of a particular product and showing a selection of a plurality of options selected by a user.
Figure 7:
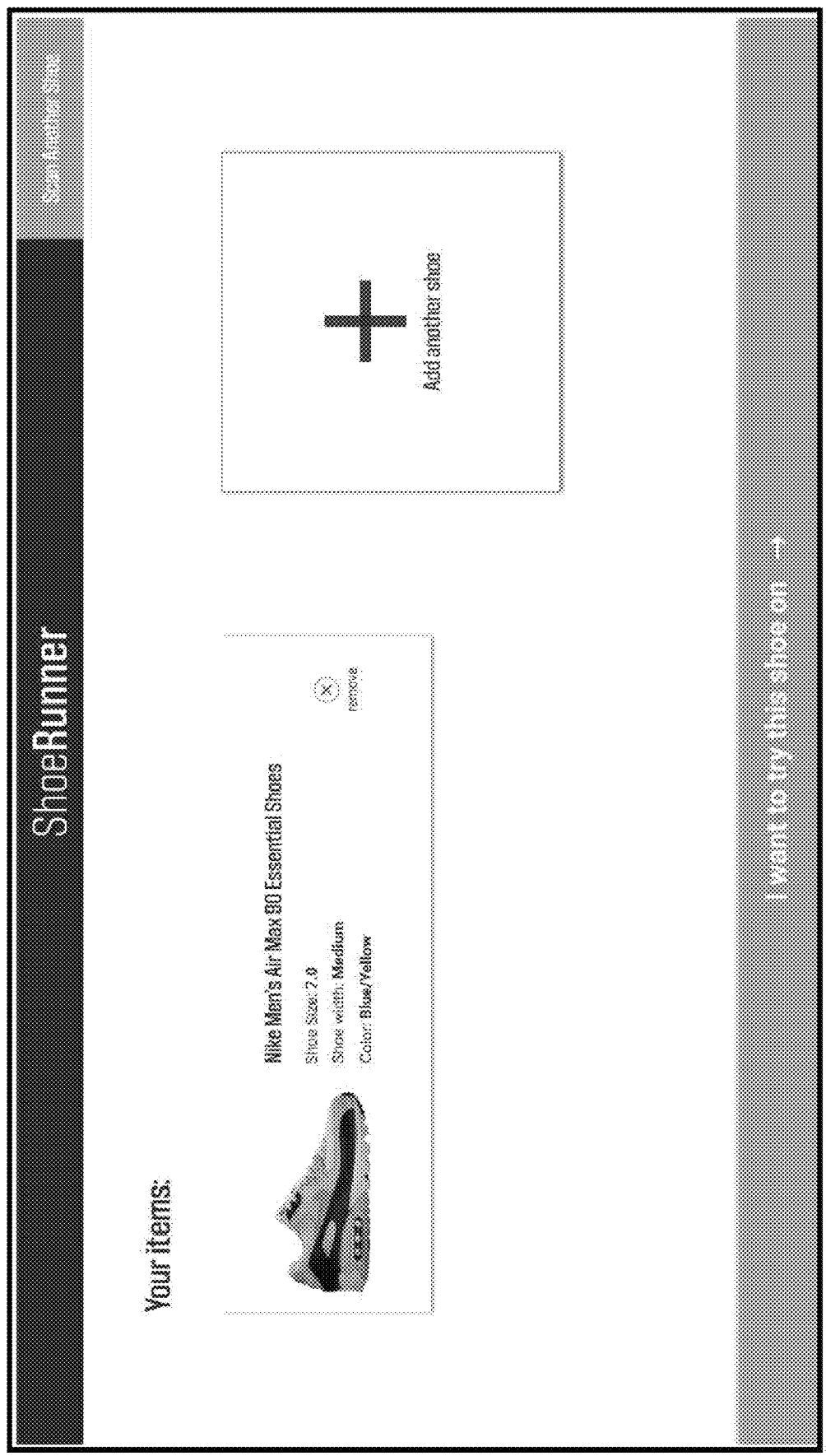
FIG. 7 shows a screenshot of an example graphical user interface displaying an item cart.
Figure 8:
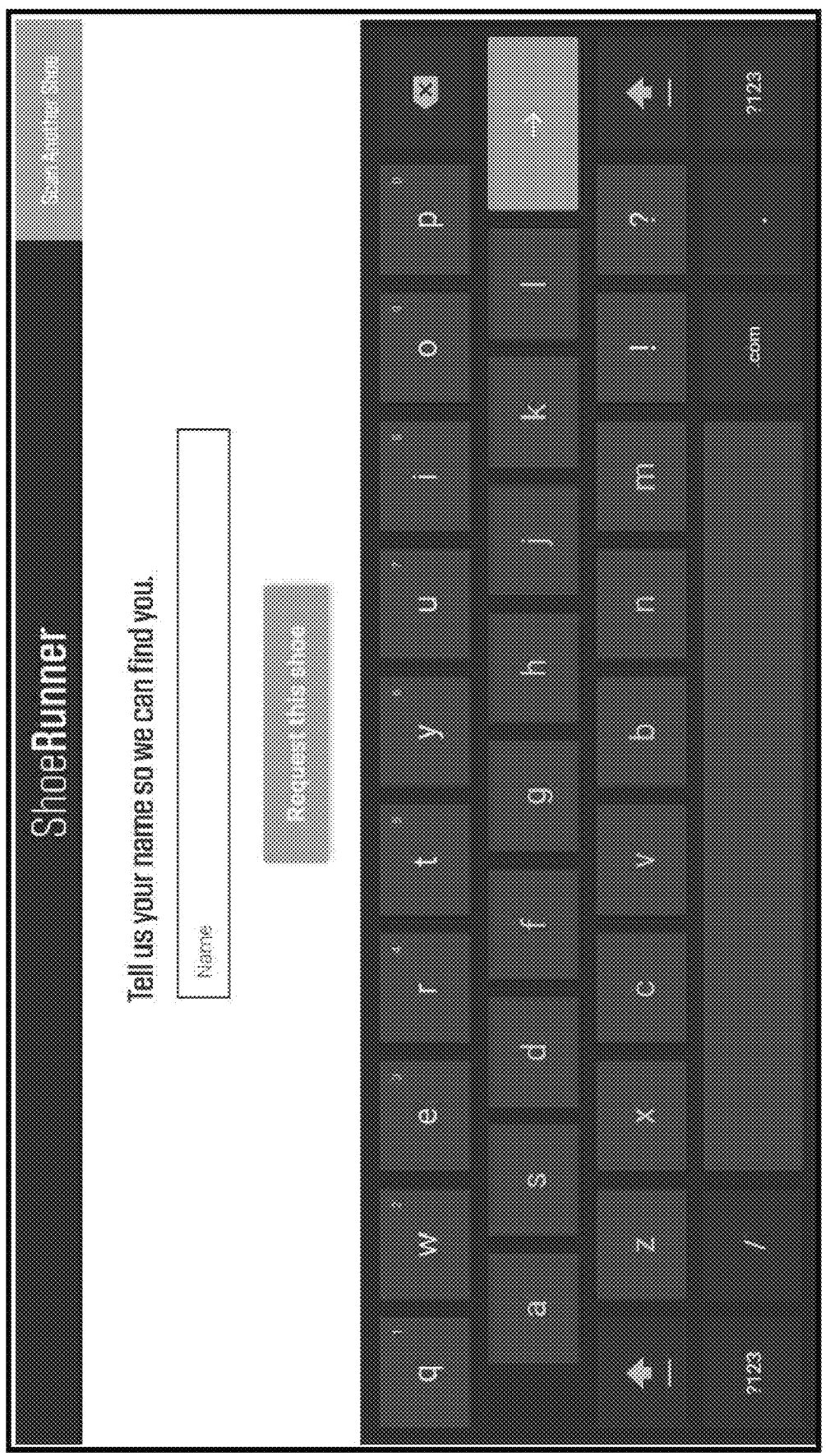
FIG. 8 shows a screenshot of an example graphical user interface displaying a user identification input screen.

According to an embodiment, one or more on-premises electronic devices 110 may be configured such that a customer may input customer information (e.g., the customer's name, as shown in FIG. 8), add one or more products to the cart (shown, for example, in FIG. 7), and/or request the one or more products be brought to the customer while the customer is on location, for example at the retail establishment. According to various embodiments, after selecting a product, the user may select that the user desires to try the product (for example, as shown in FIGS. 6-7), and requests to see the product.

In various embodiments, the system 100 may be used to assist a user in identifying, locating, and/or requesting footwear. However, it understood that the system 100 may be used to assist a user in identifying, locating and/or requesting various other types of products within the scope of this disclosure. For instance, the system 100 may be used to assist a customer with apparel, sporting good products, and/or other merchandise.

Figure 9:
FIG. 9 shows a screenshot of an example graphical user interface displaying a confirmation screen.

Once a user makes a product selection via an on-premises electronic device 110 (e.g., the selection shown in FIG. 6, wherein a user selects, e.g., a size, width, and color of a shoe), an associate may be notified of the selection via an associate electronic device 115. An associate refers to a person responsible for assisting a customer according to an embodiment. For instance, in a retail establishment, an associate may be an employee of the establishment. According to various embodiments, once a product request has been made, a confirmation, such as that shown in FIG. 9, is displayed to the user.

When a product request occurs, one or more associates may receive a notification via one or more associate electronic devices 115 that includes information pertaining to the requested product or products. This information may include, without limitation, a product identifier, a size, a color, a description, and/or a location in a stockroom or other holding area where the product can be found. The associate may then bring the one or more products to the customer to inspect, try on and/or the like. In various embodiments, an associate electronic device 115 may include, for example, a mobile phone, a tablet computer, a laptop computer, a desktop computer and/or any other suitable electronic devices.

According to an embodiment, one or more of the on-premises electronic devices 110 may communicate with one or more remote electronic devices 135 via a communication network. A remote electronic device 135 may be located remotely from an on-premises electronic device 110. An example of a remote electronic device may include, for example, a remote server. A communication network may be a local area network (LAN), a wide area network (WAN), a mobile or cellular communication network, an extranet, an intranet, the Internet and/or the like. As illustrated by FIG. 1, a remote electronic device 135 may include or be in communication with one or more data stores 140. A firewall 145 may exist between one or more on-premises electronic devices 110 and one or more remote electronic devices 135. As shown in FIG. 1, a remote electronic device 135 may be in communication with one or more associate electronic devices 115 via a communication network.

According to an embodiment, one or more remote electronic devices 135 may receive a request from one or more on-premises electronic devices 110. The request may be for information (e.g., sizes available, colors available, widths available, location, etc.) pertaining to one or more products. In response to this request, the one or more remote electronic devices 135 may access the one or more data stores 140 in order to retrieve the requested information. Upon retrieving the requested information, information, images, requests, and/or notifications may be sent to the on-premises electronic device 110 from which the request originated, or to one or more other devices (e.g., a display device 120).

In various embodiments, a system 100 may include one or more beacon devices 150. A beacon device 150 refers to a device having a wireless transmitter. One or more beacon devices may be located within an environment such as, for example, a retail location. In an embodiment, one or more beacon devices may be located within a portion of an environment. For instance, one or more beacon devices may be positioned at a designated pick up location within a retail location. Additional and/or alternate locations may be used within the scope of this disclosure.

A beacon device 150 may include a processor, a wireless transmitter, one or more motion sensors and/or a power source. Examples of motion sensors include, without limitation, an infrared sensor, an ultrasonic sensor, a motion camera, and/or the like. A motion sensor of a beacon device 150 may detect movement in proximity to the beacon device. For instance, a motion sensor may detect movement that occurs within a threshold distance from a beacon device 150. For example, one or more beacons 150 that are located in a pickup area may detect movement or motion in the pickup area. This movement or motion may be indicative of a customer who has physically entered in the area to pick up an order.

In various embodiments, a beacon device 150 may communicate with one or more electronic devices, such as, for example, an associate electronic device 115, via a wireless transmitter. For example, upon detecting motion in proximity to a beacon device 115, the beacon device may send a notification to an associate electronic device 115 via a wireless transmitter.

Figure 2:
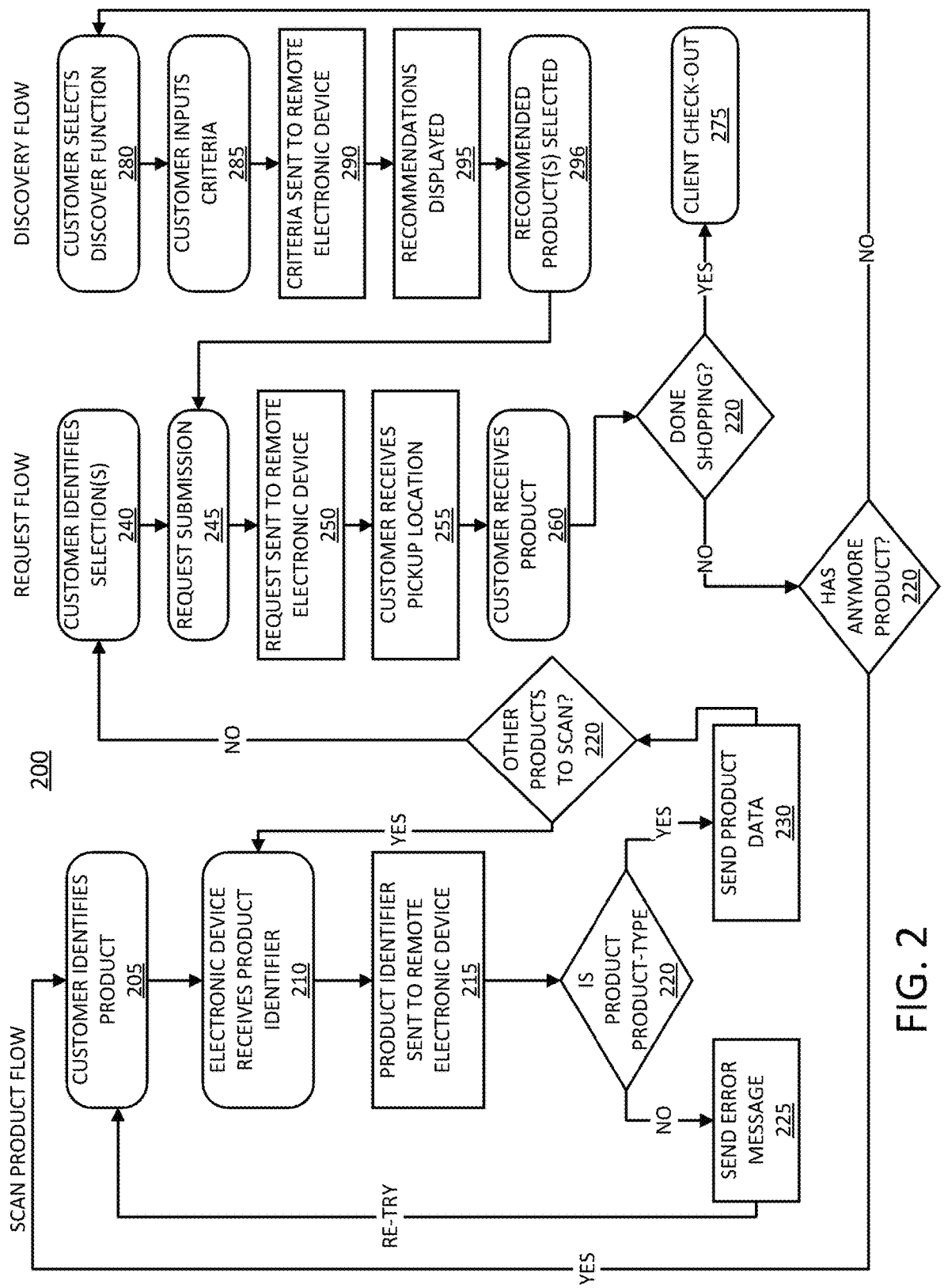
FIG. 2 and FIG. 3 show a flow chart of an example method of requesting merchandise using an on-premises electronic device.
Figure 3:
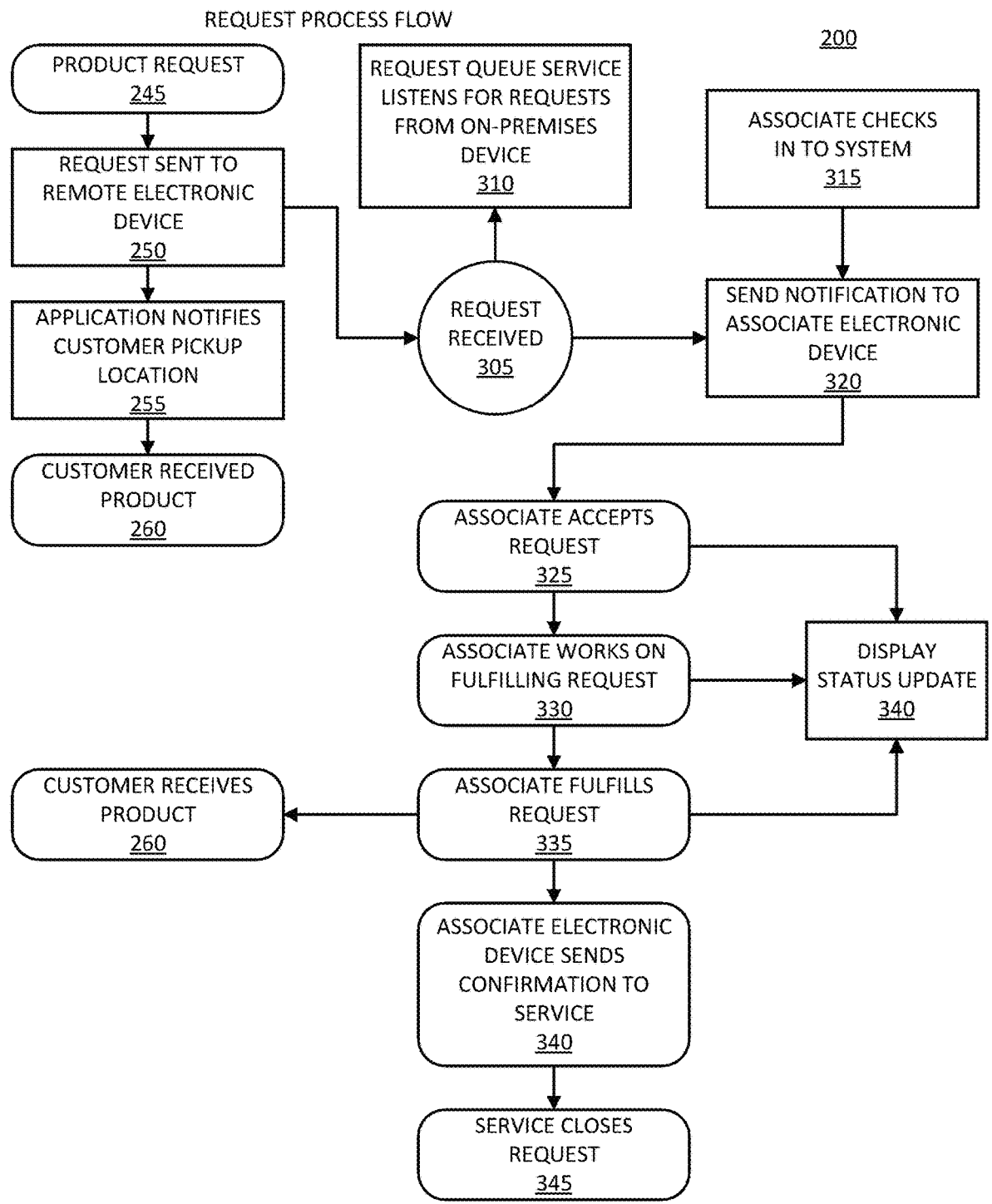

FIG. 2 illustrates a flow chart of an example method of requesting a product using an on-premises electronic device according to an embodiment. Although FIG. 2 describes a method in connection with requesting footwear, it is understood that the method may be used in connection with other types of products within the scope of this disclosure.

As illustrated by FIG. 2, a customer may identify 205 an article of footwear using an on-premises electronic device. For example, a customer may identify 205 footwear by using a scanning device of an on-premises electronic device to scan information from a product tag associated with the product such as, for example, a barcode. Once a product is scanned, the on-premises electronic device may display to the customer, using a graphical user interface, an indication of whether the footwear item is in stock at that location. For example, a customer may be shown, using the graphical user interface, a product result page, showing the available versions of the scanned footwear that are available (showing sizes, widths, colors, etc.) at the current location.

Figure 4:
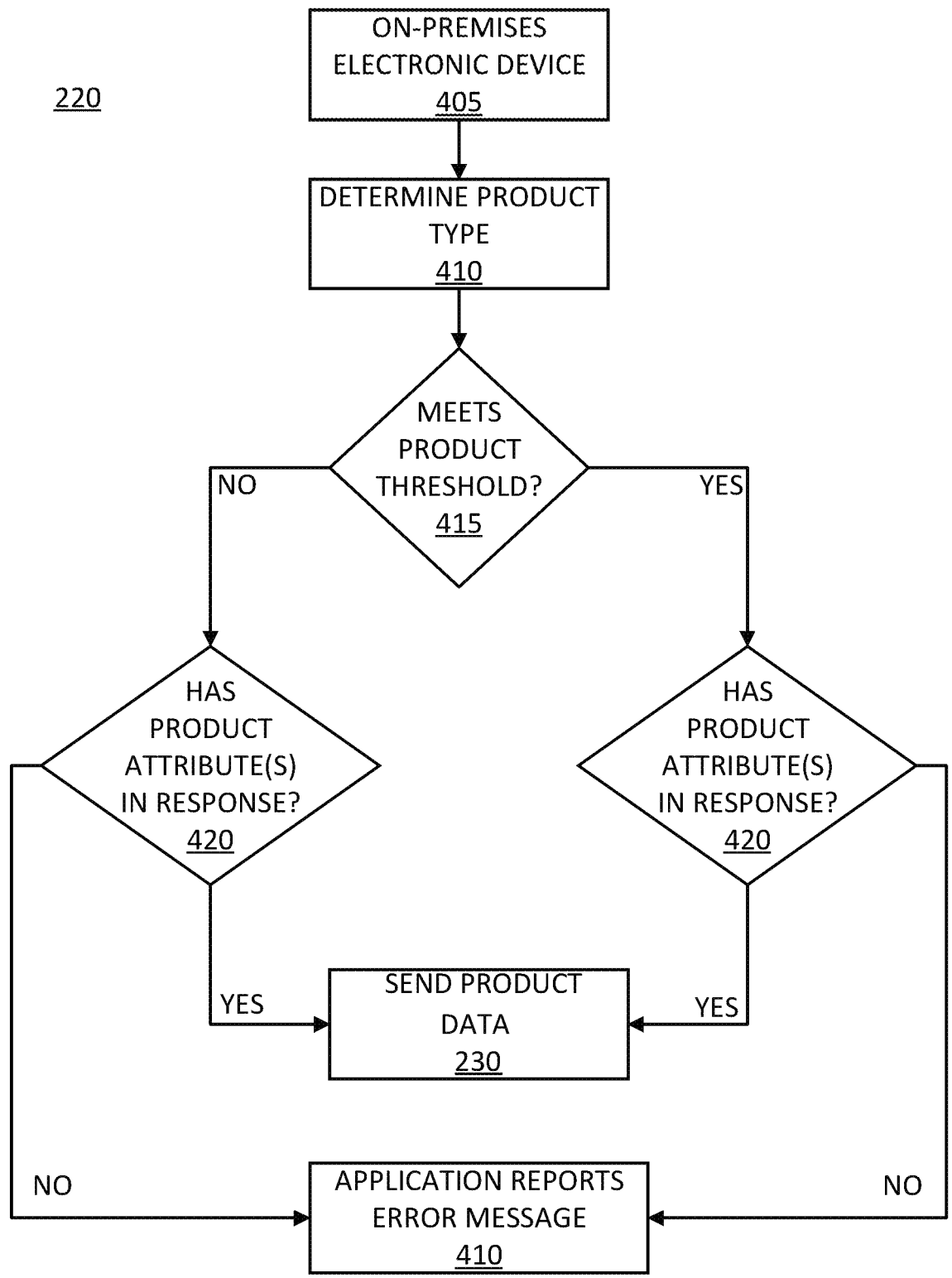
FIG. 4 shows a flow chart of an example method for determining whether a product is an article of footwear.

According to an embodiment, when a customer scans a product tag associated with a footwear product, an on-premises electronic device may receive 210 a product identifier associated with the product. For instance, a scanning device may scan a barcode located on a product tag and an on-premises electronic device may receive from the scanning device a unique product identifier associated with the product from the scanned barcode. The on-premises electronic device may send 215 the unique product identifier to a remote electronic device. The remote electronic device may use the unique product identifier to obtain product data pertaining to the product. For example, the remote electronic device may retrieve product data from one or more data stores. A remote electronic device may receive the unique product identifier, and may determine 220 if the scanned product is an article of footwear. The determination of whether the product is an article of footwear is further shown and described in FIG. 4.

According to an embodiment, after an on-premises electronic device requests product data, the on-premises electronic device, at step 405 (shown in FIG. 4), may receive a product response that includes at least a portion of the requested data. The remote electronic device may analyze at least a portion of information stored in one or more data stores to determine product information pertaining to that product. In certain embodiments, this product information may include a product image, one or more product attributes and/or characteristics and/or the like.

According to an embodiment, the product image and/or one or more attributes of the product, may be analyzed by the remote electronic device to determine if the product is of a particular product type. For example, a product image may be analyzed to determine if the product is an article of footwear, an item of clothing, an item of headwear, and/or other type of product. In certain embodiments, the system may determine whether a product is of a product type that corresponds to an on-premises electronic device from which a request originated. For example, an on-premises electronic device may be associated with one or more product types based on a location of the on-premises electronic device in a retail establishment. For instance, if an on-premises electronic device is located in a footwear department of a retail establishment, the system may determine whether products that are requested from the on-premises electronic device are footwear. A remote electronic device may determine whether a product is of a product type that corresponds to an on-premises electronic device by accessing one or more data stores having this information. For example, a data store may store a database, table, chart and/or the like that includes a listing of one or more on-premises devices and one or more corresponding product types. As another example, a remote electronic device may identify a product type associated with an on-premises electronic device by sending a request to the on-premises electronic device and receiving from the on-premises electronic device an indication of one or more product types associated with the on-premises electronic device.

The remote electronic device may use one or more image processing techniques to determine 410, based on the product image, if a product is of a particular product type, such as, for example, an article of footwear, an article of clothing, an article of headwear, etc. In various embodiments, an image processing technique may be an artificial intelligence (AI) technique and/or a machine learning technique. For example, a remote electronic device may use one or more computer vision techniques.

In an embodiment, a remote electronic device may determine if a product is of a particular product type by applying a machine learning model to at least a portion of a product image. As described in more detail throughout this disclosure, a machine learning model may be trained on one or more product attributes.

In an embodiment, a machine learning model may include a historical product data store. A historical product data store may be database, table or other data structure that may store information about one or more historical products processed by one or more remote electronic devices.

A remote electronic device may apply a machine learning model to determine if a product is of a particular product (or to which product type, if any, a product corresponds). The remote electronic device may apply a machine learning model by performing one or more machine learning methods to at least a portion of the data stored by the historical product data store. For example, a remote electronic device may use one or more product attributes for a product as input to one or more machine learning methods, which may compare at least a portion of the product attributes to information included in the historical product data store to identify similar historical products having similar product attributes.

In various embodiments, a remote electronic device may apply a machine learning model to one or more product images to determine if a product is a particular product (or to which product type, if any, a product corresponds). The machine learning model may apply one or more image processing techniques to the product image to ascertain information pertaining to the product such as, for example one or more product attributes. In various embodiments, the machine learning model may be trained on historic product images and associated product information.

A machine learning model may be consistently updated with new data from one or more products. Similarity between products or product types may be determined by applying a search algorithm or methodology that uses one or more if-then statements, weights or threshold values, or that determines significance of one or more parameters by analysis of variation. As another example, one or more product attributes or other data may be extrapolated based on the data set for products where not all parameter or variable values are the same as historical data.

In various embodiments, a machine learning model may be trained from decision trees, support-vector machines, neural networks, logistic regression, or any other supervised or unsupervised machine learning method or other techniques as a person of skill in the art will understand, such as those discussed above or other similar processes and algorithms from machine learning.

According to an embodiment, the AI technique and/or the machine learning technique may be used to detect bad, incomplete, and/or inaccurate data. When data is input by one or more users, there is the possibility for error. By leveraging the AI technique and/or machine learning technique, the system may confirm that one or more product images and one or more portions of product data are congruent. For example, the system may consider one or more product attributes and/or a product image to determine if a product is of a particular product type. In various embodiments, if the product is determined to not be of a particular product type (for example, an expected product type based on where an on-premises electronic device is located in a retail establishment), the system may return an error. As such, artificial intelligence techniques and/or machine learning techniques may serve as a quality control for one or more data stores to facilitate the maximization of product results even when data may be flawed.

By applying one or more image processing techniques to a product image, a remote electronic device may ascertain one or more attributes associated with the product. The remote electronic device may compare one or more of these ascertained attributes to one or more product descriptors typically associated with the applicable product type (e.g., footwear, clothing, headwear, etc.) to determine whether the product is in fact an item of a product type, i.e., does the product meet the threshold 415 for what is considered an item of the product type. Furthermore, the remote electronic device may analyze 420 one or more attributes of the product (e.g., size, width, color, material, brand, gender, type) to determine if it coincides with attributes of a product type (e.g., footwear).

In certain embodiments, a data store may include one or more product descriptors. A product descriptor refers to one or more features, characteristics or attributes typically associated with a product or product type. In the context of footwear, a product descriptor may include measurements (or ranges of measurements) pertaining to size, length, height, width, volume, shape, color, gender, brand, material and/or the like. It is understood that additional and/or alternate product descriptors may be considered within the scope of this disclosure. It is also understood that additional and/or alternate product descriptors may be considered for different types of products.

A remote electronic device may access a data store to obtain one or more relevant attributes. The remote electronic device may obtain one or more attributes from a product image and/or product data associated with the product to determine whether such attributes are consistent with product descriptors that are typically associated with the product type.

For example, if a customer scans a barcode associated with a running shoe, a remote electronic device may access from a data store product data associated with the unique identifier in the barcode. The product data may include a size and a width associated with the shoe. The remote electronic device may retrieve from a data store a product image associated with the unique identifier. The remote electronic device may perform one or more image processing techniques on the retrieved product image to ascertain one or more attributes of the product, such as, for example, a length and a width. The remote electronic device may compare one or more of the attributes ascertained from the product image and/or the product data to one or more product descriptors associated with footwear. For example, a remote electronic device may determine based on the product image and/or the product data of a scanned product that it has a length of 10 inches. The remote electronic device may compare this value to a range of lengths typically associated with shoes (e.g., 5-16 inches) to see if the measurement is consistent with that of footwear.

In various embodiments, a remote electronic device may determine that a product is an item of a product type if each considered attribute is consistent with its corresponding product descriptor. In other embodiments, a remote electronic device may determine that a product is an item of a product type if certain attributes are consistent with their corresponding product descriptor, or are within a certain margin of error or threshold variation from such product descriptor. For instance, a product descriptor may indicate a length of a footwear item may be between 5-16 inches, plus or minus 2 inches.

In various embodiments, a remote electronic device may determine whether a product is an item of a product type based on a comparison of the totality of its attributes to product descriptors. In other words, a remote electronic device may determine that a product is an item of a product type even if one or more of its attributes do not correlate to its corresponding product descriptor. Similarly, a remote electronic device may determine that a product is not an item of a product type if one or more attributes vary too much from a corresponding product descriptor. For instance, if a remote electronic device determines based on a product image and/or product data that the length of the product is 20 feet, the remote electronic device may determine that this product is not footwear item regardless of whether the other product attributes are consistent with product descriptors for a footwear item. As another example, if a remote electronic device determines based on a product image and/or product data that the product is made of wood, the remote electronic device may determine that this product is not footwear regardless of whether the other product attributes are consistent with product descriptors for a footwear item.

If the remote electronic device determines that the product is not an item of a product type, it may return 225 an error message to requesting on-premises electronic device, which may display the error message to the user. The customer may then retry the request and/or scan a new product. According to an embodiment, if the product image does not match the attributes, malformed data may be reported, enabling the product's attributes to be corrected and/or updated in the applicable data store(s).

If the remote electronic device determines that the product is an item of a product type, the remote electronic device may send 230 to the requesting on-premises electronic device corresponding product data (e.g., an image of the product) and/or inventory information pertaining to that product. For instance, a remote electronic device may use the unique product identifier associated with the product to retrieve a product record associated with the product from one or more data stores. The product record may include information pertaining to the product. In various embodiments, a remote electronic device may use the unique product identifier associated with the product to identify inventory information pertaining to the product. The inventory information may include a current inventory level or status of the product at the retail establishment. A remote electronic device may identify inventory information from an inventory data store that is in communication with the remote electronic device. The inventory data store may be updated based on purchases made, returns made, and/or the like.

At step 235, the customer is asked if the customer has other products that the customer wishes to scan. If the customer has additional products that the customer wishes to scan, then step 210 repeats and the customer scans the product using the one or more scanning devices. According to an embodiment, this is repeated for each product that the customer wishes to scan.

If the customer does not have additional products to scan, at step 240, the customer may identify product selections that the customer wishes to request. The product selections may correspond to one or more attributes of the product such as, for example, size, width, color, material, brand, gender, gait type, type of fit, product type and/or the like.

This selection may be made via a user interface of an on-premises electronic device. Once the selection of the attributes is made, the customer may, at step 245, submit a request for the selected product with the selected attributes. According to an embodiment, this submission may include selecting a "Next" or similar button or element. It is noted, however, that any suitable means for submitting the request may be used within the scope of this disclosure. Once the customer submits the request, the on-premises electronic device may send, at step 250, the request to a remote electronic device. According to an embodiment, the customer may receive 255 a location at which to pick up the product, enabling the customer to go to the pickup location to receive 260 the product. This location may be displayed to the user via the on-premises electronic device. Alternatively, the system may send a message that includes the location to a mobile device associated with the user such as, for example, an SMS text message, an alert message an email message and/or the like.

According to various embodiments, one or more beacons may be used to detect the presence of one or more individuals in a pickup area. A motion sensor of a beacon device may detect movement or motion within a threshold distance from the beacon device. In response to detection such movement or motion, the beacon may send a notification to one or more electronic devices such as, for example, one or more associate electronic devices. The notification may alert an associate that someone is present in a pickup area. It is noted that other suitable detection technologies may alternatively, or additionally, be used to detect the presence of an individual in a pickup area such as, for example, video surveillance and/or the like. If the presence of a customer in a pickup area is not detected, an associate may temporarily de-prioritize fulfillment due to a customer not being physically present to receive the order. If the presence of a customer is detected, the associate may know with confidence that someone is in the general pickup area and fulfill the request(s) the associate is undertaking.

According to various embodiments, an associate may be provided with one or more identification elements to identify a customer associated with a request. These identification elements may include, but are not limited to, the customer's photograph and/or name. According to various embodiments, the customer's photograph is obtained using an image capture device (for example, a camera), coupled to the kiosk device at the point of submitting the request. The customer may be instructed, on the kiosk, to supply a digital photograph of the customer and/or may be instructed to position the customer's face in front of the camera coupled to the kiosk. According to various embodiments, the customer may be provided with the associate's name and picture.

A remote electronic device may receive 305 a request that includes one or more product selections, and may send 320 a notification of such request to one or more associate electronic devices. According to an embodiment, the remote electronic device may listen 310 for a request. According to an embodiment, the notification may be a visual notification, auditory notification, vibratory notification, digital notification, and/or any other suitable means of notifying an associate of a new request. The notification may include relevant information pertaining to the request. The relevant information may include, e.g., the customer name, the stockroom location of the product, one or more corresponding product selections (e.g., the color of the product, the size of the product, etc.), and/or any other relevant information pertaining to the product that may be of use to the associate in fulfilling the customer's request. According to an embodiment, the notification may include the customer's location or a general location at which the associate can find the customer. For example, a customer's location may be a location within a range of the on-premises electronic device that the customer used to submit a request. Alternatively, a customer's location may be determined using an indoor positioning system that may track a position of a tag, locator, device and/or the like on or with a customer. As another example, a customer's location may be a predetermined location specified by the customer, an associate, and/or an on-premises electronic device. Additional and/or alternate ways of determining a customer location may be used within the scope of this disclosure.

According to various embodiments, prior to notifying the employee/associate, at 320, the employee/associate, at 315, may log in or check in to a backend of the system, which enables the associate to receive notifications and requests. According to an embodiment, if no employee/associate is checked in to the system, one or more on-premises electronic devices may provide in-stock information to the customer, but will not allow the customer to request a product directly from the on-premises electronic device.

In various embodiments, a remote electronic device may add a received request to a request queue. A request queue may include one or more customer requests in a time-based order in which they have been submitted. In various embodiments, a remote electronic device may cause the request queue to be displayed via one or more display devices. For instance, a visual representation of the request queue may be displayed at one or more on-premises electronic devices and/or one or more display devices at a location so customers can see how many requests precede theirs in the queue. The remote electronic device may update the queue as requests are submitted and/or fulfilled.

Figure 10:
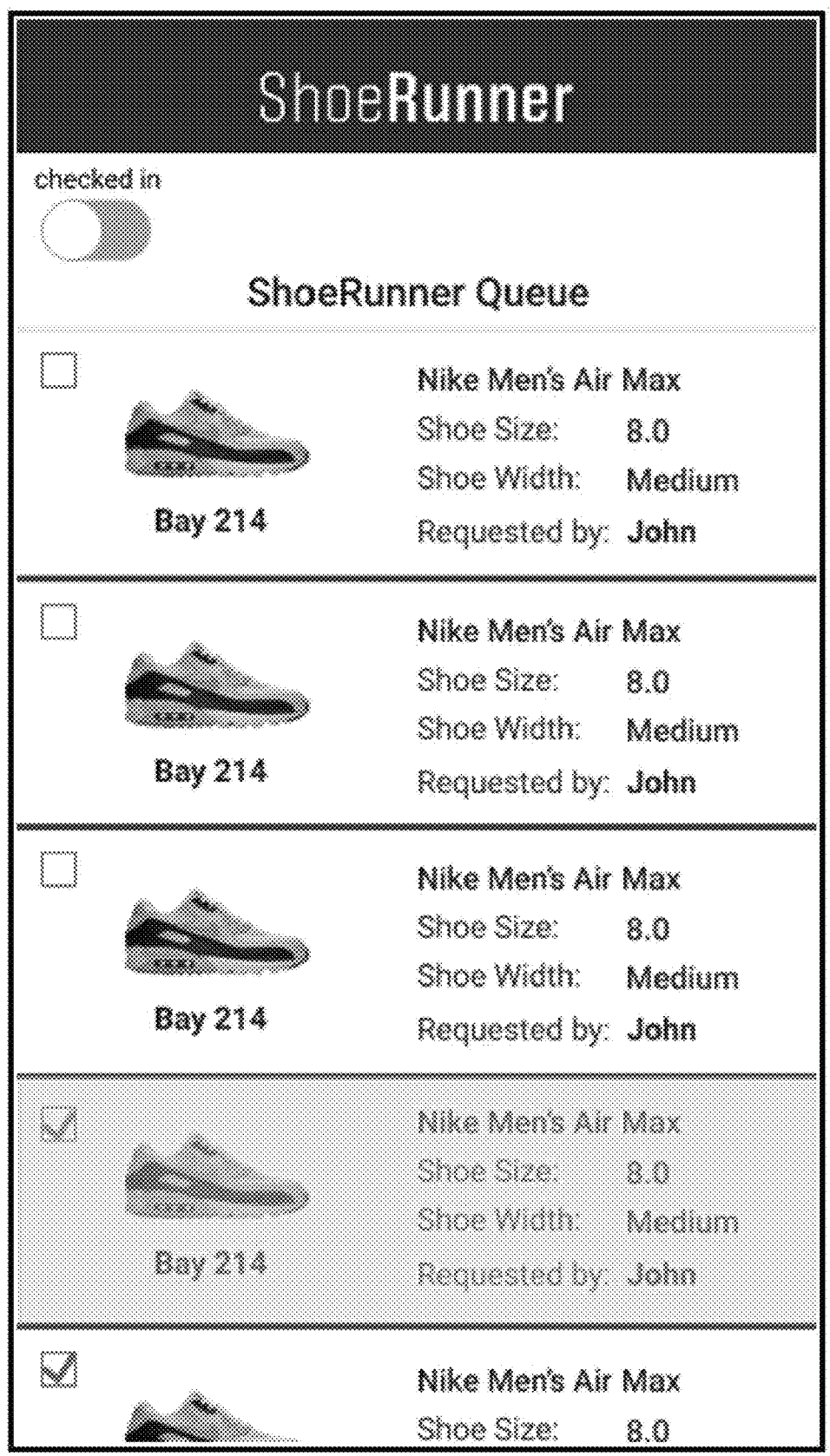
FIG. 10 shows a screenshot of an example graphical user interface for use using a mobile communications device displaying a product queue.

Once the employee/associate is checked-in to the system, the kiosk will switch to an 'allowing request' mode. At this point, requests will populate an associates queue (as shown, for example, in FIG. 10), showing any information (e.g., shoe size, color, location in backroom, name of customer who made the request, etc.) necessary for the employee/associate to be able to complete the action associated with the request. According to an embodiment, the queue for the associate will also show which associate is filling a request so that each associate does not work on a request that is already being fulfilled. Once the request is fulfilled, the shoe will be marked delivered and the associate can work on the next 'open' request in the queue.

According to an embodiment, once an associate is notified via an associate's associate electronic device, the associate may have the ability to accept or deny a request. The associate may, at step 325, accept the request and, at step 330, the associate may process the request until, at step 335, the associate fulfills the request. According to an embodiment, the status of step 325, step 330, and/or step 335 may, at step 340 be displayed via a user interface on one or more devices in order to provide an update to the customer of the status of the customer's request that the associate is fulfilling. In an embodiment, a remote electronic device may cause a message that includes a status of fulfillment of a request to an electronic device associated with a customer. For example, a customer may provide the customer's mobile phone number as part of the customer's request. The remote electronic device may cause one or more text messages to be sent to the customer's mobile phone that indicate a status of fulfillment of the customer's request. Alternatively, or in addition to the text message, the customer may be notified of the fulfillment of the customer's request using a visual and/or audio signal such as, e.g., displaying the fulfillment status on a private or public digital display.

An associate may fulfill the request upon delivering, at step 260, the product to the customer who initiated the request. Upon fulfilling the request, the associate's associate electronic device may send a confirmation message to a remote electronic device, at step 340, notifying the remote electronic device that the request has been fulfilled. Upon receiving the confirmation, the remote electronic device may close the request, at step 345. The remote electronic device may update the queue accordingly. In an embodiment, a remote electronic device may cause a message to be sent to a customer's electronic device indicating that request has been fulfilled.

In various embodiments, an on-premises electronic device may request 265 that the customer indicate whether the customer is done shopping. If the customer indicates that the customer is not done shopping, it is determined 270 whether the user has another product. If the customer indicates that the customer is done shopping, the customer may proceed to checkout 275.

In various embodiments, check-out includes purchasing the product(s) using the remote electronic device. Purchasing the product(s) may include selecting a payment method saved to the user's profile, manually inputting a new payment method using the graphical user interface, inserting a credit card and/or gift card using a card reader coupled to the on-premises electronic device, a payment scanning device configured to remotely receive payment from one or more electronic devices (e.g., smartphone, etc.), cash receiving device, and/or any other suitable forms of receiving payment.

In various embodiments, the customer may select 280 a discover function, whereby one or more products and/or product types may be queried for based on criteria input 285 by the customer. The criterial may include, e.g., size, width, color, material, brand, gender, gait type, type of fit, product type and/or the like.

In various embodiments, a remote electronic device may provide a user with one or more product recommendations. Once a customer provides a product selection to an on-premises electronic device, the on-premises electronic device may, at step 290, send criteria associated with the product to a remote electronic device which may use at least a portion of the criteria to identify one or more other products to recommend to the customer. This recommendation may be made based on products that are currently in inventory and that are similar to the product the customer requested. If the system identifies one or more other products to recommend to the customer, then the remote electronic device may, at step 295, displays information pertaining to one or more recommended products to the customer via a display device. The customer may then, at step 296, select one or more products from the one or more recommended products and may then, at step 245, request the selected recommended products. In various embodiments, the remote electronic device may notify the customer of any products that are available online for purchase and/or any products that are available in one or more nearby stores. The nearby stores may be determined by identifying which store locations are located within a predetermined distance from the store at which the on-premises electronic device is located.

According to an embodiment, a customer may have or create a profile with the system. It is also noted that, according to some embodiments, the customer may be able to create and/or set up a profile using a separate electronic device such as, e.g., a smart phone, a tablet computer, a laptop computer, a desktop computer, and/or any other suitable electronic device. According to an embodiment, the system may make recommendations based on the customer's profile, such as, for example, past purchases and/or any other relevant information included in the customer's profile. In various embodiments, information associated with one or more requests made by a customer may be added to a customer's profile.

Figure 12:
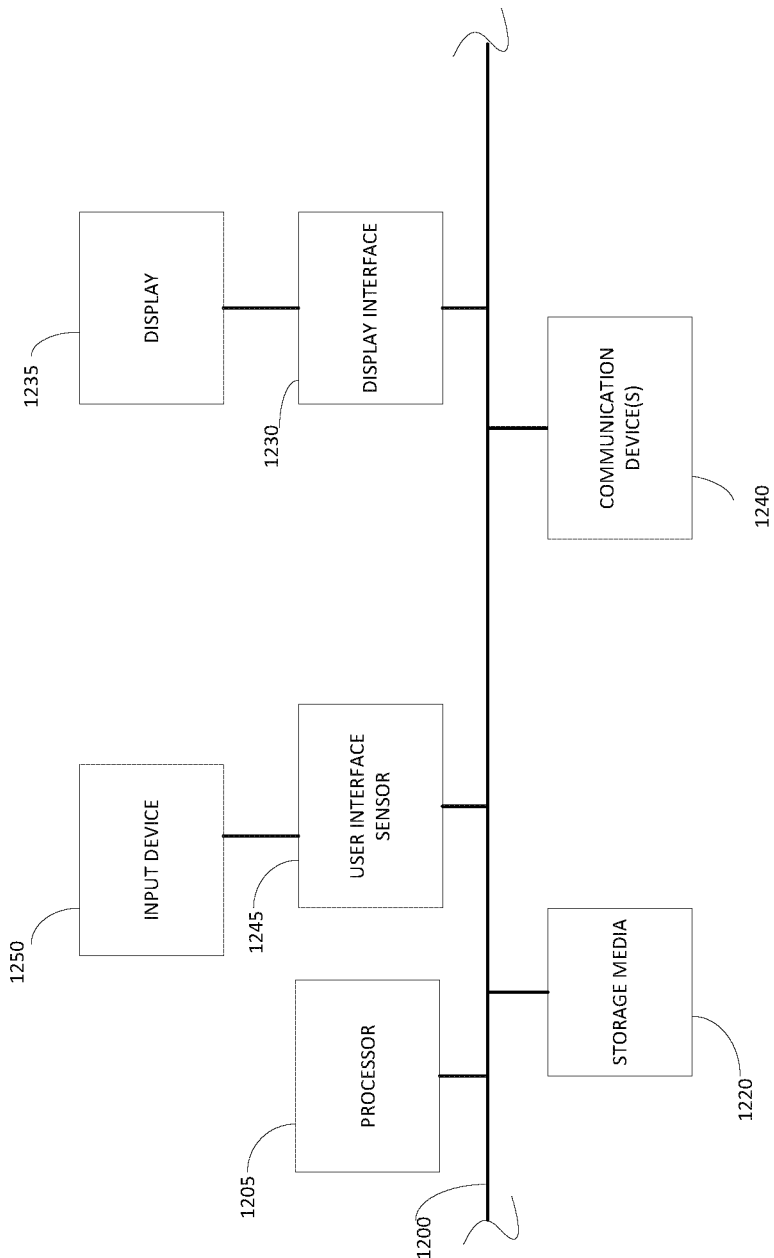
FIG. 12 illustrates a block diagram of example hardware that may be used to contain or implement program instructions according to an embodiment.

FIG. 12 depicts an example of internal hardware that may be included in any of the electronic components of an electronic device as described in this disclosure such as, for example, an on-premises electronic device, an associate electronic device, a remote electronic device and/or any other integrated system and/or hardware that may be used to contain or implement program instructions. A bus 1200 serves as the main information highway interconnecting the other illustrated components of the hardware. CPU 1205 is the central processing unit of the system, performing calculations and logic operations required to execute a program. CPU 1205, alone or in conjunction with one or more of the other elements disclosed in FIG. 12, is an example of a processor as such term is used within this disclosure. Read only memory (ROM) and random access memory (RAM) constitute examples of non-transitory computer-readable storage media 1220, memory devices or data stores as such terms are used within this disclosure.

Program instructions, software or interactive modules for providing the interface and performing any querying or analysis associated with one or more data sets may be stored in the computer-readable storage media 1220. Optionally, the program instructions may be stored on a tangible, non-transitory computer-readable medium such as a compact disk, a digital disk, flash memory, a memory card, a USB drive, an optical disc storage medium and/or other recording medium.

An optional display interface 1230 may permit information from the bus 1200 to be displayed on the display 1235 in audio, visual, graphic or alphanumeric format. Communication with external devices may occur using various communication ports 1240. A communication port 1240 may be attached to a communications network, such as the Internet or an intranet. In various embodiments, communication with external devices may occur via one or more short range communication protocols.

The hardware may also include an interface 1245, such as graphical user interface, which allows for receipt of data from input devices such as a keyboard or other input device 1250 such as a mouse, a joystick, a touch screen, a remote control, a pointing device, a video input device and/or an audio input device.

The described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A system for requesting a product at a retail establishment, the system comprising:
an electronic device; and
a computer-readable storage medium comprising one or more programming instructions that, when executed, cause the electronic device to:
receive, from an on-premises electronic device located at a retail establishment, data pertaining to a product, wherein the data comprises a unique identifier associated with the product,
determine whether the product is an item of footwear,
in response to determining that the product is an item of footwear, identify current inventory information associated with the product,
send at least a portion of the current inventory information to the on-premises electronic device,
receive, from the on-premises electronic device, a request for the product wherein the request comprises one or more product selections, and
send a notification of the request to one or more associate electronic devices, wherein each associate electronic device is associated with an associate in the retail establishment.

2. The system of claim 1, wherein the unique identifier associated with the product was obtained by a scanning device associated with the on-premises electronic device.

3. The system of claim 2, wherein the scanning device comprises one or more of the following:
a barcode scanner;
a radio-frequency identification scanner; or
an image capturing device.

4. The system of claim 1, wherein the one or more programming instructions that, when executed, cause the electronic device to determine whether the product is an item of footwear comprise one or more programming instructions that, when executed, cause the electronic device to:
retrieve a product record associated with the product from a data store based on the unique identifier;
identify from the product record one or more attributes of the product;
identify one or more product descriptors associated with footwear; and
for one or more of the attributes, determine if the attribute is consistent with its corresponding product descriptor.

5. The system of claim 4, wherein the one or more attributes comprise one or more of the following:
a size;
a width;
a color;
a material;
a brand;
a gender; or
a product type.

6. The system of claim 1, wherein the one or more programming instructions that, when executed, cause the electronic device to determine whether the product is an item of footwear comprise one or more programming instructions that, when executed, cause the electronic device to:
retrieve a product record associated with the product from a data store based on the unique identifier;
identify from the product record one or more attributes of the product; and
apply a machine learning model to the one or more attributes.

7. The system of claim 1, wherein the one or more programming instructions that, when executed, cause the electronic device to determine whether the product is an item of footwear comprise one or more programming instructions that, when executed, cause the electronic device to:
    retrieve a product image associated with the product from a data store based on the unique identifier; and
    apply a machine learning model to the product image.

8. The system of claim 1, wherein the one or more programming instructions that, when executed, cause the electronic device to determine whether the product is an item of footwear comprise one or more programming instructions that, when executed, cause the electronic device to:
    retrieve a product record associated with the product from a data store based on the unique identifier;
    identify a product image associated with the product from the product record;
    perform one or more image processing techniques on the product image to identify one or more attributes of the product;
    identify one or more product descriptors associated with footwear; and
    for one or more of the attributes, determine if the attribute is consistent with its corresponding product descriptor.

9. The system of claim 1, wherein the computer-readable storage medium further comprises one or more programming instructions that, when executed, cause the electronic device to, in response to determining that the product is not an article of footwear, cause an error message to be displayed at the on-premises electronic device.

10. The system of claim 1, wherein the computer-readable storage medium further comprises one or more programming instructions that, when executed, cause the electronic device to:
    add the request to a queue of received requests; and
    cause a visual representation of the queue to be displayed via one or more display devices in the retail establishment.

11. A method for requesting a product at a retail establishment, the method comprising:
    receiving, from an on-premises electronic device located at a retail establishment, data pertaining to a product, wherein the data comprises a unique identifier associated with the product;
    determining whether the product is an item of footwear;
    in response to determining that the product is an item of footwear, identifying current inventory information associated with the product;
    sending at least a portion of the current inventory information to the on-premises electronic device;
    receiving, from the on-premises electronic device, a request for the product wherein the request comprises one or more product selections; and
    sending a notification of the request to one or more associate electronic devices, wherein each associate electronic device is associated with an associate in the retail establishment.

12. The method of claim 11, wherein receiving data pertaining to the product further comprises:
    scanning a target item coupled to the product using a scanning device associated with the on-premises electronic device.

13. The method of claim 12, wherein the scanning device comprises one or more of the following:
    a barcode scanner;
    a radio-frequency identification scanner; or
    an image capturing device.

14. The method of claim 11, wherein the determining whether the product is an item of footwear further comprises:
    retrieving a product record associated with the product from a data store based on the unique identifier;
    identifying from the product record one or more attributes of the product;
    identifying one or more product descriptors associated with footwear; and
    for one or more of the attributes, determining if the attribute is consistent with its corresponding product descriptor.

15. The method of claim 14, wherein the one or more attributes comprise one or more of the following:
    a size;
    a width;
    a color;
    a material;
    a brand;
    a gender; or
    a product type.

16. The method of claim 11, wherein determining whether the product is an item of footwear comprises:
    retrieving a product record associated with the product from a data store based on the unique identifier;
    identifying from the product record one or more attributes of the product; and
    applying a machine learning model to the one or more attributes.

17. The method of claim 11, wherein determining whether the product is an item of footwear comprises:
    retrieving a product image associated with the product from a data store based on the unique identifier; and
    applying a machine learning model to the product image.

18. The method of claim 11, wherein the determining whether the product is an item of footwear further comprises:
    retrieving a product record associated with the product from a data store based on the unique identifier;
    identifying a product image associated with the product from the product record;
    performing one or more image processing techniques on the product image to identify one or more attributes of the product;
    identifying one or more product descriptors associated with footwear; and
    for one or more of the attributes, determining if the attribute is consistent with its corresponding product descriptor.

19. The method of claim 11, further comprising:
    in response to determining that the product is not an article of footwear, causing an error message to be displayed at the on-premises electronic device.

20. The method of claim 11, further comprising:
    adding the request to a queue of received requests; and
    causing a visual representation of the queue to be displayed via one or more display devices in the retail establishment.

* * * * *